J. G. ROGERS.

Improvement in Holdback.

No. 129,253.  Patented July 16, 1872.

Witnesses,
Henry Michael
S. H. Wheeler

Inventor,
John G. Rogers

UNITED STATES PATENT OFFICE.

JOHN G. ROGERS, OF CASS COUNTY, MICHIGAN.

IMPROVEMENT IN HOLD-BACKS.

Specification forming part of Letters Patent No. 129,253, dated July 16, 1872.

I, JOHN G. ROGERS, of the county of Cass and State of Michigan, have made certain Improvements in Hold-Back Irons, of which the following is a specification:

The nature of this invention relates to self-attaching hold-backs of the class used on one-horse vehicles; the object being to so construct the parts as to dispense with the large projecting hook commonly employed in such devices, and in supplying such parts as tend to strengthen the device as a whole.

Figure 1:
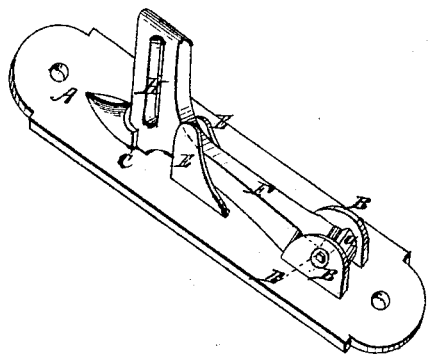
Figure 2:
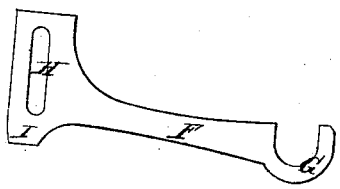

The accompanying drawing forms a part of this specification, and shows in Figure 1 a perspective view of a device embodying my invention. Fig. 2 shows a plan of the detachable bar.

Letters of reference are marked thereon to denote the parts designated by a similar letter in the written part of this specification, of which—

A represents a metal plate. This plate is attached permanently to the upper side and near the front end of the thills of a one-horse vehicle, and is provided at the front end with the lugs B B. These lugs support the pivot D. At midway of the plate A I provide the ears E E. These ears serve as guides to the bar F. This bar is provided at the front end with semicircular hook G, and at the other end with the loop H and toe I. This toe engages with the cove C near the rear end of plate A. The office of this cove is to receive a portion of the strain on the bar F and relieve the strain on the hook G.

To operate this hold-back the bar F is permanently attached to the hold-back strap of the harness by means of the loop H. Then the horse is placed between the thills, and before the tugs are hitched the bar F is hooked on to the pivot D, when the upper end is thrown back between the ears E E, causing the toe I to engage with the cove C. In this position the tugs are hitched and the hold-back attachment is completed. And all that is required to be done in disengaging a horse from a vehicle is to unhitch the tugs from the whiffletree, when the rear end of the bar F will swing forward as the horse moves from the vehicle, causing the shoulder of the hook to impinge on the rib $a$ and disengage the hook automatically. Now, it will be seen that the large hook commonly attached to thills is dispensed with by this invention, and the inconvenience arising from the liability to strike a horse's foot when stepping between the thills is avoided.

Having thus described my invention, what I claim is—

The hold-back, consisting of the plate A having the lugs B B, with pivot D, rib $a$, and cove C, and ears E E, when used in connection with the bar F having the hook G, loop H, and toe I, all as and for the purposes set forth.

JOHN G. ROGERS.

Witnesses:
HENRY MICHAEL,
S. H. WHEELER.